Patented May 5, 1931

1,803,588

UNITED STATES PATENT OFFICE

ARTHUR D. BLANK, OF SAN FRANCISCO, CALIFORNIA, HENRY A. KOHMAN, OF PITTSBURGH, PENNSYLVANIA, AND ALFRED SCHULTZ, OF NEW YORK, N. Y., ASSIGNORS, BY MESNE ASSIGNMENTS, TO STANDARD BRANDS, INCORPORATED, OF DOVER, DELAWARE, A CORPORATION OF DELAWARE

LEAVENED PRODUCT AND COMPOSITION OF MATTER

No Drawing.   Application filed October 22, 1928.   Serial No. 314,315.

This invention relates to novel compositions of matter for use associated with yeast in making "short" leavened products and to improved methods of making such product.

A general object of the invention is to provide a composition of matter and a method such that "short" leavened products of improved quality may be made with increased yields and with a saving in cost both as to time, labor and materials.

A more specific object of the invention is to provide a composition of matter for use in, and a method of, cracker making whereby the quality of the crackers, both as to flavor and internal and external appearance is improved, the volume of baked product is increased and the time and labor required in preparing the dough for baking are substantially reduced.

Other objects of the invention will in part be obvious and will in part appear hereinafter.

The invention accordingly comprises the several steps and the relation and order of one or more of such steps with respect to each of the others, and the composition of matter possessing the features, properties, and the relation of constituents, which are exemplified in the following detailed disclosure, and the scope of the application of which will be indicated in the claims.

In the heretofore known methods of making "short" leavened products, although salt mixtures of the bread improver type have been used, the principal reliance of the manufacturer for the desired quality of product particularly as to the "short" effect has been placed upon the use of special temperature conditions and of prolonged fermentation periods.

As an example typical of the heretofore known processes, attention might be called to the method now generally in use of making soda crackers which is known as the "sponge process." In this process, a sponge is first made of the yeast and a proportion of the flour, water and shortening, the sponge is set at from 68–70° F. and fermented for eighteen hours. The remainder of the water, flour and shortening, and the sugar material, salt and other ingredients are then mixed in together with a small amount of soda, whereupon the dough is left to stand several hours longer. During each of these fermentation times the conditions of room temperature and condition of the mixes must be carefully watched.

In accordance with the principles of the present invention, a shortening of time and decrease of costs is accomplished, in that the sponge time may be entirely eliminated without sacrifice of the quality of baked goods with improvement in flavor, and with the production of increased yields. The increase in yield is due not only to an increase in the volume of baked product, but also to the fact that by the elimination of the sponge time, the fermentation losses are minimized, and to the fact that more water can be incorporated in the mix.

The achievement of the above-mentioned and other desirable results is largely dependent upon the use in the dough mix of a material having an acid reaction which gives an initial acidity to the dough, an ammonium salt which functions not only to supply nitrogen to the yeast, but which, in so functioning, releases further acidity which aids in conditioning the dough, an oxidizing salt which acts as a dough-maturing agent, a material adapted to act enzymatically on the dough to facilitate the conditioning thereof, and a material which acts during the baking to decrease or neutralize the dough acidity.

Although the present invention is to be understood as not being limited thereto, examples of materials which have been found satisfactory for the purposes stated are: phosphoric acid, calcium acid phosphate, potassium acid phosphate, or other suitable acid or acid salts as the acid ingredient; ammonium chloride, ammonium phosphate, or other suitable ammonium salt as the nitrogen and subsequent acid source; potassium bromate, potassium iodate, or other suitable oxidizing salt as the dough-maturing agent; an enzymatic agent, such as papain, pepsin, taka-diastase or a diastatically active malt extract; and soda as the ingredient which neutralizes the acidity during baking.

A very convenient manner of using the processes of the type mentioned is to utilize a dry composition of matter which contains a properly proportioned mixture of certain of these materials, preferably admixed with a filler, such as flour or the like, which acts as a diluent and allows the ingredients to be easily weighed and aids in the thorough distribution of the active ingredients throughout the dough mass.

More specifically, although it is to be understood that the invention is not to be limited thereby, a composition of matter which has been found to be particularly adapted for the use as aforesaid is one comprising about 448 parts of flour, 400 parts of calcium acid phosphate, 144 parts of ammonium chloride, 4 parts of potassium bromate, and 4 parts of papain. This will hereinafter be referred to as "composition A."

A typical example of the dough materials and the method used in the manufacture of soda crackers with the utilization of the principles of the present invention is as follows:

Ingredients

| | |
|---|---|
| 980 lbs. flour | 20 lbs. yeast |
| 320 lbs. water | 10 lbs. sugar |
| 100 lbs. shortening | 5 lbs. composition A |
| 15 lbs. salt | 5 lbs. soda |

Mixing method

Dissolve the yeast, sugar and composition A separately in parts of the water, put about half of the flour into the mixer, add the salt, add balance of the water and also the dissolved yeast and composition A materials. Mix until clear, adding the shortening while the mixer is running, add sugar; continue this mixing for about three or four minutes. Stop the mixer and add the balance of the flour, sifting the soda on top. Again start the mixer and mix until the dough is quite clear, at which time the dough should have a temperature of about 83° F. Give the dough five hours fermentation, cut and bake.

This straight-dough process eliminates the uncertainty involved in any sponge method and produces uniform goods of fine flavor and eating quality. There is no labor cost in handling the sponges or in remixing, and, because of the short fermentation period, fewer troughs and less dough room space are needed. Refrigeration of the dough rooms is unnecessary, even during the summer months. Also the doughs produced by this method have great stability and do not deteriorate rapidly as in long-time sponge doughs.

Experiments have shown that the shortometer tests of doughs made by the present improved method are several hundred units lower than those made by the heretofore known methods, and the doughs will not break during handling. Also, it has been found that lower grades of flour can be used with this method and increased yields therefrom can be obtained, thus further reducing the cost of manufacture of the baked products.

Since, therefore, the objects of this invention have been accomplished, and since certain changes in carrying out the above processes and certain modifications in the composition which embodies the invention may be made without departing from the scope, it is intended that all matter contained in the above description shall be interpreted as illustrative and not in a limiting sense.

Having described our invention, what we claim as new and desire to secure by Letters Patent is:

1. A new composition of matter comprising, in combination, an oxidizing salt having a dough-maturing action, an ingredient having an acid reaction, an ammonium salt adapted to supply nitrogen to the yeast and simultaneously to release acid components, and an enzymatic substance adapted to aid in the conditioning of the dough to be used with yeast and a neutralizing agent in making "short" leavened products.

2. A new composition of matter comprising, in combination, an admixture of a filler, an oxidizing salt having a dough-maturing action, an ingredient having an acid reaction, an ammonium salt adapted to supply nitrogen to the yeast and simultaneously to release acid components, and an enzymatic substance adapted to aid in the conditioning of the dough to be used with yeast and a neutralizing agent in making "short" leavened compounds.

3. A new composition of matter comprising, in combination, an admixture of flour, an oxidizing salt having a dough-maturing action, an ingredient having an acid reaction, an ammonium salt adapted to supply nitrogen to the yeast and simultaneously to release acid components, and an enzymatic substance adapted to aid in the conditioning of the dough to be used with yeast and a neutralizing agent in making "short" leavened compounds.

4. A new composition of matter comprising, in combination, an admixture of flour, an oxidizing salt having a dough-maturing action, a calcium salt having an acid reaction, an ammonium salt adapted to supply nitrogen to the yeast and simultaneously to release acid components, and an enzymatic substance adapted to aid in the conditioning of the dough to be used with yeast and a neutralizing agent in making "short" leavened compounds.

5. A new composition of matter comprising, in combination, an admixture of flour, an oxidizing salt having a dough-maturing action, calcium acid phosphate, an ammonium salt, adapted to supply nitrogen to the yeast and simultaneously to release acid components, and an enzymatic substance adapted to aid in the conditioning of the dough to be used with yeast and a neutralizing agent in making "short" leavened compounds.

6. A new composition of matter comprising in combination, an admixture of a filler, potassium bromate, calcium acid phosphate, an ammonium salt adapted to supply nitrogen to the yeast and simultaneously to release acid components, and an enzymatic substance adapted to aid in the conditioning of the dough to be used with yeast and a neutralizing agent in making "short" leavened compounds.

7. A new composition of matter comprising, in combination, an admixture of a filler, potassium bromate, calcium acid phosphate, ammonium chloride adapted to supply nitrogen to the yeast and simultaneously to release acid components, and an enzymatic substance adapted to aid in the conditioning of the dough to be used with yeast and a neutralizing agent in making "short" leavened compounds.

8. A new composition of matter comprising, in combination, an oxidizing salt having a dough-maturing action, an ingredient having an acid reaction, an ammonium salt adapted to supply nitrogen to the yeast and simultaneously to release acid components, and a dry enzymatic substance adapted to aid in the conditioning of the dough to be used with yeast and a neutralizing agent in making "short" leavened compounds.

9. A new composition of matter comprising, in combination, an oxidizing salt having a dough-maturing action, an ingredient having an acid reaction, an ammonium salt adapted to supply nitrogen to the yeast and simultaneously to release acid components, and papain adapted to aid in the conditioning of the dough to be used with yeast and a neutralizing agent in making "short" leavened products.

10. A process of making a "short" yeast-leavened dough product such as soda crackers, which includes admixing with the yeast, a portion of the flour, and the other dough ingredients, an oxidizing salt having a dough-maturing action, an ingredient having an acid reaction, an ammonium salt adapted to supply nitrogen to the yeast and simultaneously to release acid components, and an enzymatic substance adapted to aid in the conditioning of the dough, admixing with the dough thus formed the remainder of the flour and a neutralizing agent such as soda, allowing the mixture to stand for a few hours and then cutting and baking.

11. A process of making a "short" yeast-leavened dough product, such as soda crackers, which includes admixing with the yeast, a portion of the flour, and the other dough ingredients, an oxidizing salt having a dough-maturing action, calcium acid phosphate, an ammonium salt adapted to supply nitrogen to the yeast and simultaneously to release acid components, and an enzymatic substance adapted to aid in the conditioning of the dough, admixing with the dough thus formed the remainder of the flour and a neutralizing agent such as soda, allowing the mixture to stand for a few hours and then cutting and baking.

12. A process of making a "short" yeast-leavened dough product, such as soda crackers, which includes admixing with the yeast, a portion of the flour, and the other dough ingredients, an oxidizing salt having a dough-maturing action, potassium bromate, calcium acid phosphate, an ammonium salt adapted to supply nitrogen to the yeast and simultaneously to release acid components, and an enzymatic substance adapted to aid in the conditioning of the dough, admixing with the dough thus formed the remainder of the flour and a neutralizing agent such as soda, allowing the mixture to stand for a few hours and then cutting and baking.

13. A process of making a "short" yeast-leavened dough product, such as soda crackers, which includes admixing with the yeast, a portion of the flour, and the other dough ingredients, an oxidizing salt having a dough-maturing action, potassium bromate, calcium acid phosphate, ammonium chloride and an enzymatic substance adapted to aid in the conditioning of the dough, admixing with the dough thus formed the remainder of the flour and a neutralizing agent such as soda, allowing the mixture to stand for a few hours and then cutting and baking.

14. A process of making a "short" yeast-leavened dough product, such as soda crackers, which includes admixing with the yeast, a portion of the flour, and the other dough ingredients, an oxidizing salt having a dough-maturing action, an ingredient having an acid reaction, an ammonium salt adapted to supply nitrogen to the yeast and simultaneously to release acid components, and papain adapted to aid in the conditioning of the dough, admixing with the dough thus formed the remainder of the flour and a neutralizing agent such as soda, allowing the mixture to stand for a few hours and then cutting and baking.

15. A process of making a "short" yeast-leavened dough product such as soda crackers, which includes admixing with the yeast, a portion of the flour, and the other dough ingredients, an oxidizing salt having a dough-maturing action, potassium bromate, calcium acid phosphate, ammonium chloride, and papain adapted to aid in the conditioning of the dough, admixing with the dough thus formed the remainder of the flour and a neutralizing agent such as soda, allowing the mixture to stand for a few hours and then cutting and baking.

16. A process of making a "short" yeast-leavened dough product such as soda crackers, which includes admixing with the yeast, a portion of the flour, and the other dough ingredients, an oxidizing salt having a dough-maturing action, potassium bromate in about 0.02 parts, calcium acid phosphate in about 2.0 parts, ammonium chloride in about 0.7 parts, and papain in 0.2 parts, each by weight per 1000 parts by weight of flour used, admixing with the dough thus formed the remainder of the flour and about 5 parts of soda, allowing the mixture to stand for a few hours and then cutting and baking.

17. A straight-dough method of making soda crackers, which comprises using materials substantially in the following proportions:

| | |
|---|---|
| 980 lbs. flour | 20 lbs. yeast |
| 320 lbs. water | 10 lbs. sugar |
| 100 lbs. shortening | 5 lbs. composition A |
| 15 lbs. salt | 5 lbs. soda | mixing about half of the flour with the other ingredients except the soda, adding the remainder of the flour and the soda and mixing to a temperature of about 83° F., allowing to ferment about five hours, and then cutting and baking.

18. A new composition of matter including, in combination, the following ingredients in substantially the proportions given: potassium bromate about 0.02 parts, calcium acid phosphate about 2.0 parts, ammonium chloride about 0.7 parts, and papain about 0.2 parts, to be used with yeast and a neutralizing agent such as soda in the manufacture of "short" leavened products such as soda crackers.

In testimony whereof we have hereunto affixed our signatures.

ARTHUR D. BLANK.
HENRY A. KOHMAN.
ALFRED SCHULTZ.

CERTIFICATE OF CORRECTION.

Patent No. 1,803,588.  Granted May 5, 1931, to

ARTHUR D. BLANK ET AL.

It is hereby certified that error appears in the printed specification of the above numbered patent requiring correction as follows: The last word of claims 2, 3, 4, 5, 6, 7 and 8, pages 2 and 3, for the word "compounds" read products; and that the said Letters Patent should be read with these corrections therein that the same may conform to the record of the case in the Patent Office.

Signed and sealed this 30th day of June, A. D. 1931.

(Seal)

M. J. Moore,
Acting Commissioner of Patents.